US009348517B2

(12) United States Patent
Hineman et al.

(10) Patent No.: US 9,348,517 B2
(45) Date of Patent: May 24, 2016

(54) USING A MIGRATION THRESHOLD AND A CANDIDATE LIST FOR CACHE MANAGEMENT OF SEQUENTIAL WRITE STORAGE

(71) Applicant: International Business Machines Corporation, Armonk, NY (US)

(72) Inventors: Wayne C. Hineman, San Jose, CA (US); Robert M. Rees, Los Gatos, CA (US); Pin Zhou, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

(21) Appl. No.: 14/471,438

(22) Filed: Aug. 28, 2014

(65) Prior Publication Data

US 2016/0062651 A1 Mar. 3, 2016

(51) Int. Cl.
*G06F 13/00* (2006.01)
*G06F 3/06* (2006.01)
*G06F 12/08* (2016.01)

(52) U.S. Cl.
CPC .............. *G06F 3/061* (2013.01); *G06F 3/0619* (2013.01); *G06F 3/0665* (2013.01); *G06F 3/0689* (2013.01); *G06F 12/0871* (2013.01); *G06F 2212/604* (2013.01)

(58) Field of Classification Search
CPC ..... G06F 3/061; G06F 3/0689; G06F 3/0619; G06F 3/0665; G06F 12/0871; G06F 2212/604; G06F 12/02; G06F 17/30091; G06F 17/30233

USPC .............................. 711/164, 144, 161, 6, 221
See application file for complete search history.

(56) References Cited

U.S. PATENT DOCUMENTS

| 8,020,036 B2 | 9/2011 | Soran et al. | |
|---|---|---|---|
| 8,949,208 B1* | 2/2015 | Xu | G06F 7/00 707/661 |
| 2011/0138106 A1* | 6/2011 | Prabhakaran | G06F 12/0804 711/103 |
| 2012/0210095 A1 | 8/2012 | Nellans et al. | |
| 2012/0233434 A1 | 9/2012 | Starks et al. | |
| 2012/0278799 A1 | 11/2012 | Starks et al. | |

(Continued)

OTHER PUBLICATIONS

Biplob Debnath et al., "FlashStore: High Throughput Persistent Key-Value Store," Proceedings of the VLDB Endowment, v.3, n.2, pp. 1414-1425, 2010.

(Continued)

*Primary Examiner* — Hong Kim
(74) *Attorney, Agent, or Firm* — Cantor Colburn LLP; Bryan Butler

(57) ABSTRACT

Embodiments of the invention relate to cache management of sequential write storage. Cache states of cache blocks in cache storage are tracked. The tracking incudes creating a migration candidate list that organizes the cache blocks into virtual volumes. Based on determining that a cache migration threshold has been reached, at least a subset of the cache blocks are selected from the migration candidate list for migration. The selected cache blocks are ordered into a sequential order based on the migration candidate list. At least a subset of the selected cache blocks are migrated in the sequential order, the migrating including writing contents of the selected cache blocks to the sequential write storage.

20 Claims, 4 Drawing Sheets

(56) References Cited

U.S. PATENT DOCUMENTS

2013/0073820 A1* 3/2013 Watanabe ............. G06F 3/0611
 711/162
2013/0227236 A1 8/2013 Flynn et al.
2014/0115241 A1* 4/2014 Wei ..................... G06F 12/0246
 711/103
2014/0250155 A1* 9/2014 Chen ................. G06F 17/30091
 707/823

OTHER PUBLICATIONS

Cong-Feng Jiang et al., "Resource Allocation in Contending Virtualized Environments through Stochastic Virtual Machine Performance Modeling and Feedback," Journal of Information Science and Engineering, 29, pp. 299-327, 2013.

Wang et al., "Virtual Log Based File Systems for a Programmable Disk," Operating Systems Review, 33, pp. 29-44, 1998.

* cited by examiner

USING A MIGRATION THRESHOLD AND A CANDIDATE LIST FOR CACHE MANAGEMENT OF SEQUENTIAL WRITE STORAGE

BACKGROUND

The present invention relates generally to cache storage, and more specifically, to the management of cache storage for sequential write storage.

For many contemporary companies, data is an important asset and the amount of data requiring storage is growing at an exponential rate. Much of this data includes semi-active and/or unstructured data and thus, may not be well suited for storage in a traditional database system. Due to the ever increasing volume of corporate data that must be stored, for example, in formats not suited for traditional database systems, even relatively low cost consumer-grade serial advanced technology attachment (SATA) disks may prove to be very costly.

Tapes and shingled magnetic recording (SMR) disks are generally inexpensive and dense, and thus, they are good candidates for the main storage of massive amounts of corporate data. Drawbacks to tapes and SMR disks are related to their sequential write nature. Additional drawbacks of tapes have to do with their long access latency.

SUMMARY

Embodiments include a method, system and computer program product for cache management of sequential write storage. Cache states of cache blocks in cache storage are tracked. The tracking incudes creating a migration candidate list that organizes the cache blocks into virtual volumes. Based on determining that a cache migration threshold has been reached, at least a subset of the cache blocks are selected from the migration candidate list for migration. The selected cache blocks are ordered into a sequential order based on the migration candidate list, where the selected cache blocks that are located on the same virtual volume are grouped together in the sequential order. At least a subset of the selected cache blocks are migrated in the sequential order, the migrating including writing contents of the selected cache blocks to the sequential write storage.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
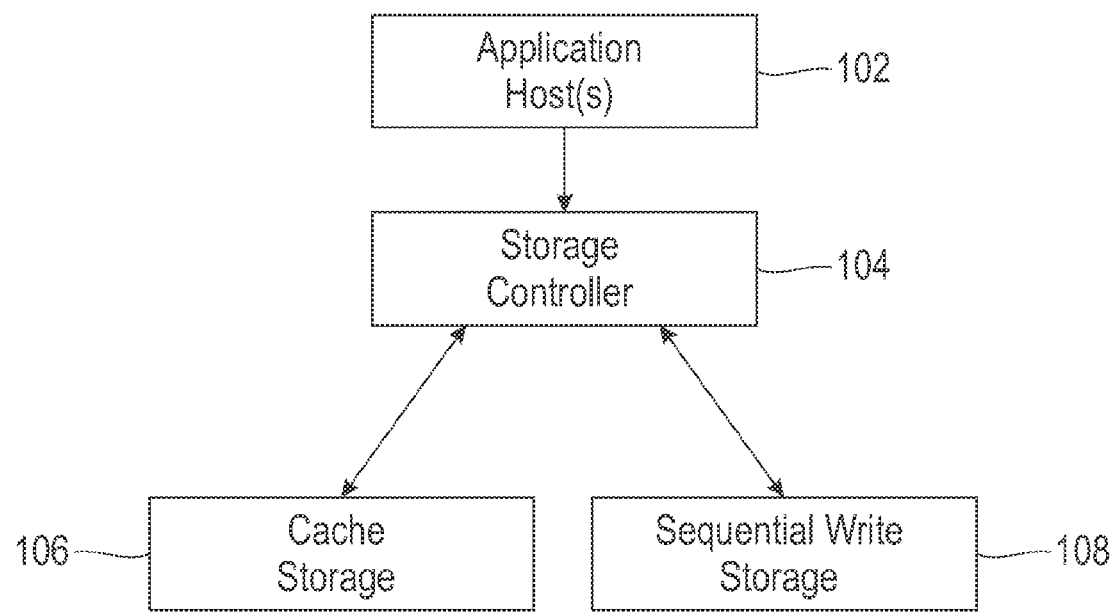
FIG. 1 illustrates a block diagram of a system for providing cache management for sequential write storage in accordance with an embodiment.

Embodiments are directed to cache management for sequential write storage. Embodiments include the use of sequential write storage devices, such as tapes and shingled magnetic recording (SMR) disks, along with a novel cache management scheme that is tailored to sequential write storage. The cache management scheme described herein can be utilized to minimize cache metadata updates, to convert small random writes from applications into larger sequential writes in a log-structured fashion, to co-locate related data in a minimal number of devices, and/or to maintain potential access locality to improve performance of the storage system. As described herein, an embodiment of the cache storage management scheme utilizes migration sequence numbers (MSNs) and a global commit sequence number (CSN) to determine cache states. A single update to the CSN can result in the cache state change of many cache blocks. In addition, small random writes from an application can be buffered and converted into one or more large sequential writes in a log-structured fashion for migration to one or more sequential write devices. As used herein, the term "log-structured fashion" refers to writing sequentially to a (usually circular) buffer, called a log. New data is always appended to the tip of the log, and old, invalid data is removed from the opposite end of the log; old data that is still valid must be reclaimed ("garbage collected") by re-writing it to the tip of the log.

In an embodiment, the cache blocks are organized into virtual volumes (VVOLs), with, for example, all data accessed by a particular application being stored on a specified VVOL or group of VVOLs. In addition, each VVOL can contain one or more virtual extents (VXs). In an embodiment each VX corresponds to a cache block which stores the data corresponding to the VX. A VX can be a fixed-size sub-multiple of a VVOL that can be written sparsely (meaning, variable amount of data can be written into a VX up to the fixed upper bound). In other embodiments, each VX corresponds to a different cache element such as, but not limited to a cache line. In an embodiment, each cache block that corresponds to a VX can be identified by a virtual volume identifier (VVOL-ID) plus a virtual extent number (VX-N).

Also as described herein, an embodiment of the cache management scheme can maintain a two-tiered migration candidate list to determine an order for cache block migration from the cache to main storage (e.g., sequential write storage). At the upper tier, this candidate list can organize the VXs based on their VVOL-IDs to cluster related data together and thus, capture the spatial locality of the VXs to improve read performance and reduce tape mounts for tapes. Temporal locality of accesses can be considered by ordering the VVOLs based on the summary write timestamp of each VVOL plus the number of dirty+modified cache blocks on the VVOL. At the lower tier, the candidate list can sort the VXs belonging to the same VVOL to capture the access locality, such as the temporal locality by their last write timestamp or the spatial locality by their VX-Ns, in order to improve the read performance when a cache miss occurs. Embodiments of the cache management scheme also utilize a migration list to facilitate the migration process and cache state change.

Examples of sequential write devices include, but are not limited to, tapes and shingled disks. In embodiments, due to their sequential write nature and the long access latency of tapes, a persistent, low-latency cache is added at the front end of the main storage (e.g., tapes and/or SMR disks) to improve overall performance of the storage system. Examples of devices that may be utilized for the cache include, but are not limited to serial attached small computer system interface (SAS) disks and flash devices. However, embodiments described herein do not simply involve putting a non-SMR disk cache or flash cache in front of sequential write storage devices and using existing cache management algorithms, as tape (and other sequential write storage devices) have special characteristics that can be accounted for by embodiments described herein when managing the cache. Characteristics that can be accounted for by embodiments are that tape only supports sequential writes, and its random access time can be tens of seconds. Another characteristic that can be accounted for by embodiments is that the parallelism of tape access is limited by the number of available tape drives (usually only a few). A further characteristic of tape that can be taken into account by embodiments is that mounting and/or un-mounting a tape can take tens of seconds.

All or a portion of these tape characteristics can be addressed by an embodiment of the cache management scheme that writes to the tape in a log-structured manner, maintains the sequentiality of a data object if possible, and clusters the accesses to a tape or a small set of tapes in an effort to reduce tape switching. A SMR disk is similar to a virtual tape with unrestricted random reads. Even though a SMR disk does not have the large mount/un-mount penalty and the large random access latency, it is a sequential write device which requires large log-structured writes instead of small, random writes. As used herein, the term "disk" (unless preceded by the term "SMR") refers to a non-shingled disk.

FIG. 1 illustrates a block diagram of a system for providing cache management for sequential write storage in accordance with an embodiment. As shown in FIG. 1, one or more application host computers 102 are in communication with a storage controller. Also as shown in FIG. 1, the storage controller 104 is in communication with cache storage 106 and main storage which is implemented in the embodiment shown in FIG. 1 by sequential write storage 108 (e.g., one or more tapes and/or SMR disks). Embodiments of the cache management scheme (also referred to herein as a "cache manager") described herein can be implemented by logic located on the storage controller 104. Embodiments of the cache management scheme described herein can also be implemented by logic located on one or more of the application host(s) 102, the storage controller 104, the cache storage 106, and the sequential write storage 108. In an embodiment, the cache storage 106 is a persistent memory so that contents of the cache storage 106 are not lost when power is turned off or during a restart process.

As shown in FIG. 1, the storage controller 104 is separate from the application host(s) 102 and the cache storage 106. In another embodiment, one or more of the application host(s), the storage controller 104, and the cache storage 106 are integrated into a single physical system.

In an embodiment, the cache storage 106 is logically divided into write cache and read cache. As described previously, the cache storage 106 can also be organized as VXs (virtual extents) on VVOLs (virtual volumes). Therefore, each cache block in the cache storage 106 that contains application data can be logically identified by a VVOL-ID plus a virtual extent number VX-N. In an embodiment, the data accessed by each application is assigned to one or more specific VVOL-IDs and the application data is organized into VXs on the specific VVOLs.

VXs can include metadata which is stored in the cache storage 106. In an embodiment, each VX can include the following metadata information: last write timestamp; last read timestamp; main storage location (e.g., tape location, SMR disk location); and MSN (migration sequence number). The last write timestamp can record the approximate date/time when the VX was last modified by a write operation. The write timestamp can be used as an input to the selection of VXs for writing back from the logical write portion of the cache storage 106 (referred to herein as the "write cache") to the sequential write storage 108 (e.g., during the migration process). To avoid frequent updates to the write timestamp, it can be only updated periodically (e.g., every ten minutes) instead of at each write access.

The last read timestamp metadata information can record the approximate date/time when the VX was last accessed by a read operation. The last read timestamp can be used as an input to the selection of VXs for eviction from the logical read portion of the cache storage 106 (referred to herein as the "read cache") when cache space is needed for newer data. Similar to the last write timestamp, the last read timestamp can be updated on a limited frequency basis (e.g., every ten minutes which will allow it to differ from the exact read time by no more than 10 minutes). The main storage location metadata information can include the location of the VX data within the sequential write storage 108; this is needed to read the VX data from the main storage on a cache miss. The main storage location is assigned when the VX is successfully migrated from the cache storage 106 to the sequential write storage 108. The main storage location can be set to null for VXs that have not yet been migrated or that have been modified by a write since being migrated.

In an embodiment, the MSN metadata information can be implemented as a monotonically increasing sequence number which is incremented each time a new version of a VX is migrated to the sequential write storage 108. In an embodiment, a VX that has just been created, or that has been modified by a write since being migrated to the sequential write storage 108, can have a MSN equal to infinity. When a VX is in the cache storage 106, its MSN can be compared to the CSN (global commit sequence number) in the single migration stream case, or compared to the CSN for the corresponding stream in the case of multiple migration streams, to determine if the VX is in write cache or read cache. In an embodiment, the CSN is maintained by the cache manager to indicate the largest MSN that has been successfully migrated to the sequential write storage.

In an embodiment, whether a particular VX is present in the cache storage 106 or not is determined by a cache state. In an embodiment, at any point in time, a VX can be in one of the following four cache states: invalid, clean, dirty, and dirty+modified (also referred to herein as "dirty and modified"). The cache manager can use the CSN and MSN to determine the cache state of a VX. An advantage to this approach is that it avoids updating each VXs metadata after its migration to the sequential write storage 108. In an embodiment, a VX has a cache state of invalid when its corresponding data is not stored in the cache storage 106. A null value can be used to indicate the invalid cache state. A VX has a cache state of clean when its data is in read cache, it has been migrated to main storage (or it was never overwritten), and MSN <=CSN. In an embodiment, a VX has a cache state of dirty when data is in the write cache and the VX is in a migration list that contains cache blocks to be migrated from the cache storage 106 to the sequential write storage 108 by a migration that is in process. A VX cache state of dirty can be indicated when CSN<MSN <infinity. In an embodiment, a VX has a cache state of dirty+modified when VX data is in the write cache and MSN=infinity. Thus, in embodiments, the write cache includes all VXs with a cache state of dirty or dirty+modified, and the read cache includes the VXs with a cache state of clean.

When applications write data, they may tend to write small random blocks of data at a time. This kind of write access pattern is not always suitable for sequential write devices which do not support read-modify-write operations. In embodiments described herein, the cache storage 106 can serve as a staging area so that the small write operations from the applications can be completed quickly (this is especially advantageous for burst writes), the small write operations are consolidated into several VXs, and then written back in a log-structured fashion to the main storage (e.g., sequential write storage 108) at a later time. This process of writing back to the main storage is referred to herein as "migration" or "migrating."

The method of managing the cache and of migrating write cache data back to the tape or SMR disk storage described herein is different from the traditional cache management in a disk back-end system. This is due to the cache management scheme described herein taking into account at least one of the nature of sequential write in both tape and SMR disk, and the high latency random read and costly mount/un-mount of tapes. For tapes, the cache manager described herein can maintain a clean list for quick cache eviction when cache space is needed. This is because migrating only one cache block (VX) right before its eviction is very time consuming due to the long mount/un-mount time and seek time. For SMR disks, the clean list is also beneficial for better performance.

In addition, to more efficiently migrate to sequential write storage, many dirty cache blocks (VXs) can be migrated together. The migration process described herein can be used to convert small random writes from applications to large sequential writes of several cache blocks to main storage in a log-structured fashion, and it also minimizes tape mounts and seeks for tape storage.

To improve the read performance of a cache miss, the migration order of the VXs in an embodiment is not based solely on their modification order to preserve the temporal locality as in a pure log-structured design. It can also be based on their access sequence, such as in the case of object store, to preserve the spatial locality. In addition, the persistent cache manager can try to place the logically related dirty blocks together to increase the spatial locality of the accesses to the main storage. This co-location or clustering of data can also result in putting related data on the smallest possible set of tapes to reduce tape mounts for tape storage.

Figure 2:
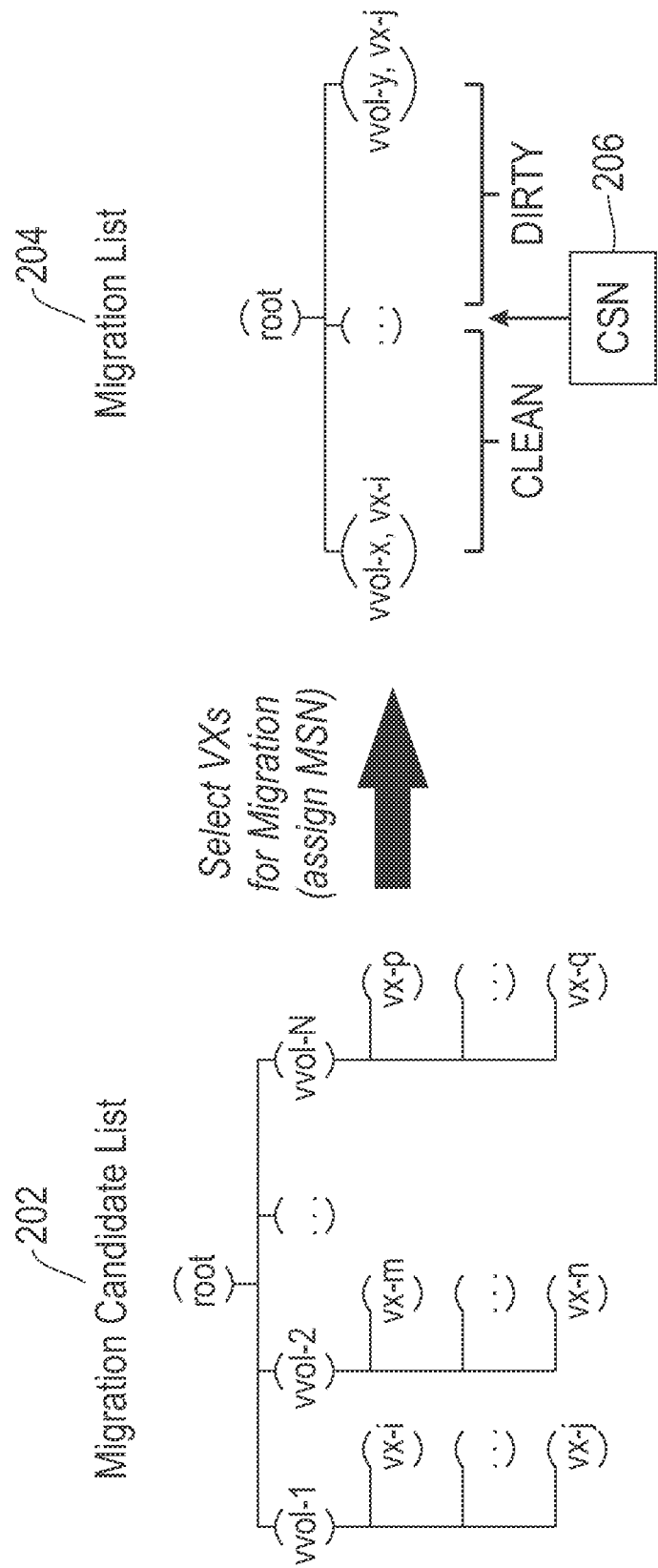
FIG. 2 illustrates a migration candidate list data structure and a migration list data structure in accordance with an embodiment.

As shown in FIG. 2, an embodiment of the cache manager maintains two memory-based data structures, a migration candidate list 202 and migration list 204 to organize all VXs stored in the cache storage 106 before, during, and after migration. The migration candidate list 202 can include all VXs with a cache state of dirty+modified (MSN=infinity) in the write cache. This migration candidate list 202 can be an ordered list and used to select and order dirty+modified VXs for migration. As shown in the embodiment in FIG. 2, the migration candidate list 202 is organized as two tiers. At the lower tier, the migration candidate list 202 organizes VXs by the VVOL to which they belong, with a VXs last write timestamp for temporal locality or simply ascending VX numbers in object store for spatial locality. As used herein the term "object store" refers to a storage architecture that manages data as objects instead of files or blocks. In object store, the data access and management is done at object-level granularity. The upper tier contains VVOLs in order of preferred migration order. The VVOLs can be ordered based on the amount of dirty+modified data accumulated for each VVOL and the summary write timestamp of each VVOL. The summary write timestamp of a VVOL can be either the earliest or the average of the individual last write timestamps for its VXs. The ordering of VVOLs can be used to give higher migration priority to the VVOLs with more and older dirty data, which again considers the temporal locality. Accumulating VXs in the same VVOL together and co-locating them to the same storage device can result in better spatial locality.

Referring to FIG. 2, a migration list 204 is generally shown in accordance with an embodiment. In an embodiment, the migration process attempts to write a large number of VXs to main storage. When the number of dirty+modified VXs accumulated in the cache storage 106 reaches a migration threshold, the migration process will start with selecting data for migration. The migration threshold can be based on user input (e.g., migrate every four hours) or it can be system generated based on application or system requirements (e.g., amount of data to be migrated must at least fill one tape). The migration threshold can be based on the total number of dirty+modified VXs, based on, but is not limited to: an age of the dirty+modified VXs, a number of dirty+modified VXs in a VVOL, an amount of free space in the cache storage 106, and an application or system checkpoint being reached. In an embodiment, groups of VXs are removed from the migration candidate list 202 and placed into the migration list 204, preserving the order of VX number by VVOL.

In an embodiment, VXs are removed following the VVOL order. For a selected VVOL, a threshold based on the last write timestamp of the VX can be used to decide how many VXs should be removed from that VVOL. As each VX is placed in the migration list 204, its MSN is updated from infinity to the global MSN maintained by the cache manager, and the global MSN is incremented. At that time, the MSN of the VX is greater than the global CSN since its migration is not done (committed) yet. This implies its state is changed from dirty+modified to dirty when a VX is first moved from the migration candidate list 202 to the migration list 204. The migration list 204 includes the VXs ordered by ascending MSN and this is the order in which the VXs are migrated to the sequential write storage 108.

In an embodiment, VXs in the migration list 204 are written back to the sequential write storage 108 following the migration list order, until a desired amount of data (e.g., a tape partition of data) is written. At that time, the maximum MSN associated with the written data is used to update the global CSN. This implies that the states of all migrated VXs in the migration list 204 are changed from dirty to clean, with only a single update to the CSN. This also implies that the clean VXs in the migration list 204 (those with MSN<=CSN) now logically belong to the read cache instead of the write cache.

In an embodiment, where the migration manager starts multiple migration streams in parallel, the migration manager can form a migration list 204 for each stream, with each migration list 204 being identified by a stream identifier. Each stream can also have its own CSN identified by the stream identifier. In an embodiment, to maintain better locality, groups of VXs are removed from the migration candidate list 202 and placed into a migration list 204 following the same ordering as above. Then, the next groups of VXs are removed from the migration candidate list 202 to form another migration list 204 for a different stream. As each VX is placed in a migration list 204, its MSN is updated from infinity to the global MSN and then the global MSN is increased by 1. At that time, the VX's MSN is greater than the CSN for the corresponding stream since its migration is not done (e.g., committed to storage) yet. The state of this VX is changed from dirty+modified to dirty. Meanwhile, VXs in a migration list are written back to the sequential write storage 108 following the migration list order, until a desired amount of data (i.e., a tape partition of data) is written. At that time, the maximum MSN associated with the written data is used to update the CSN of the corresponding migration list (or stream). The states of all migrated VXs in this migration list 204 are changed from dirty to clean, with only a single update to the corresponding CSN. The clean VXs in this migration list 204 now logically belong to the read cache.

Figure 3:
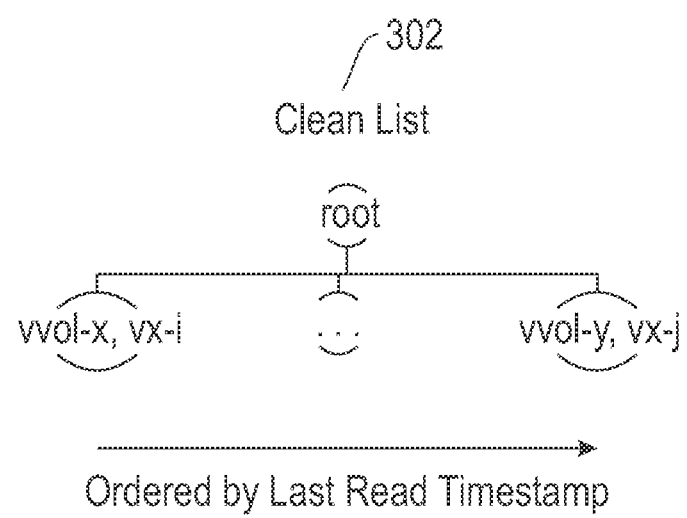
FIG. 3 illustrates a clean list data structure in accordance with an embodiment.

FIG. 3 illustrates a clean list data structure 302 that is generally shown in accordance with an embodiment. In an embodiment, cache blocks that are in a state of clean (they are in the read cache) are tracked using a memory based data structure such as the clean list 302 shown in FIG. 3. In an embodiment, when cache space is needed, the clean VXs in the read cache can be evicted. Periodically, groups of clean VXs can be removed from the migration list 204 and placed into the clean list 302 after reordering. The eviction process can then use the clean list 302 to select victims for cache replacement.

In an embodiment, the clean list 302 orders all clean VXs by their last read timestamp. In this embodiment, the order of a VX within the clean list 302 changes only when the VX's last read timestamp changes, as a result of read activity. This ordering difference (when compared to the ordering of the migration list 204) can be because for migration, the cache manager needs to consider both temporal locality for migrating cold data and spatial locality for co-locating related data together to increase read performance at a cache miss and minimize tape mounts for tapes, whereas for eviction, the cache manager only needs to consider the temporal locality to evict cold data.

Figure 4:
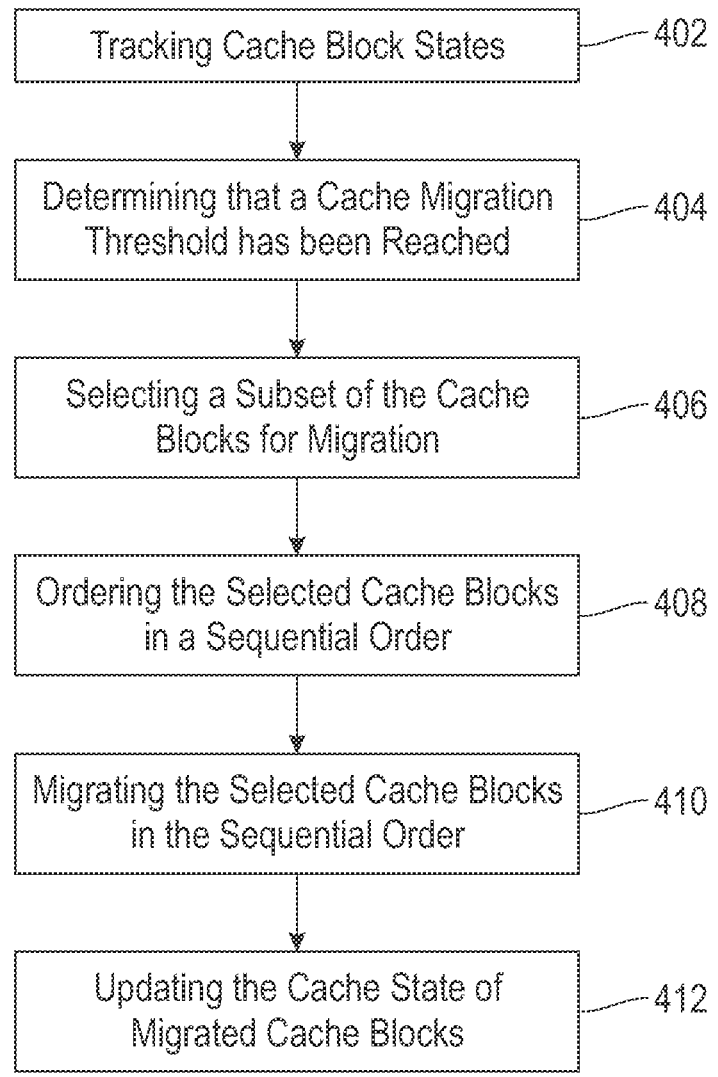
FIG. 4 illustrates a process flow for preforming cache management in accordance with an embodiment.

Referring now to FIG. 4, a process flow for performing cache management in accordance with an embodiment is generally shown. Cache states of cache blocks stored in the cache storage 106 are tracked at block 402. As described previously, each cache block corresponds to a logical VX on a logical VVOL. In an embodiment, the cache state of each cache block is one of invalid (contains no data), clean (not modified), dirty+modified (modified and on the migration candidate list 202), and dirty (modified and on the migration list 204). The cache states can be tracked as described previously with clean cache blocks on the clean list 302, dirty cache blocks on the migration list 204 and dirty+modified cache blocks on the migration candidate list 202. At block 404, it is determined that a migration threshold has been reached, and at block 406 a subset of the cache blocks are selected for migration from the migration candidate list 202. At block 408, the subset is ordered sequentially by assigning a MSN to each of the selected cache blocks as they are moved from the migration candidate list 202 to the migration list 204. Processing continues at block 410 where the selected cache blocks are migrated from the cache storage 106 to the sequential write storage 108 in the sequential order (e.g., based on the MSN numbers). At block 412, the cache states of the migrated cache blocks are updated when the writing is completed (e.g., after a commit). In an embodiment the cache state update is performed by updating the CSN to be equal to the largest MSN corresponding to a cache block with a completed write to the sequential write storage. In this manner, the cache block is added to the clean list 302.

Technical effects and benefits include the ability to provide cache management based on the characteristics of the main storage. This may lead to increased throughput and better performance of the storage system and of the overall computer system.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of cache management for sequential write storage, the method comprising:
    tracking cache states of cache blocks in a cache storage, the tracking including creating a migration candidate list that organizes the cache blocks into virtual volumes;
    determining that a migration threshold has been reached; and
    based on reaching the migration threshold:
        selecting a plurality of the cache blocks from the migration candidate list for migration;
        ordering the selected cache blocks into a sequential order based on the migration candidate list, wherein the selected cache blocks that are located on the same virtual volume are grouped together in the sequential order; and
        migrating, in the sequential order, at least a subset of the selected cache blocks, the migrating comprising, for each of the selected cache blocks in the subset, writing contents of the selected cache blocks to the sequential write storage.

2. The method of claim 1, wherein the migrating further comprises:
    periodically, based on the writing being completed for one or more of the selected cache blocks in the subset, updating the cache state of the one or more of the selected cache blocks in the subset to indicate that contents of the one or more of the selected cache blocks in the subset have completed migration to the sequential write storage.

3. The method of claim 2, wherein:
    the ordering includes assigning migration sequence numbers (MSNs) to the selected cache blocks to indicate the sequential order; and
    the updating the cache state includes updating a commit sequence number (CSN) with an MSN associated with a selected cache block whose contents have completed migration to the sequential write storage.

4. The method of claim 3, wherein:
    a selected cache block has not completed migration to the sequential write storage and is in a cache state of dirty when the MSN assigned to the selected cache block is larger than the CSN; and
    the selected cache block has completed migration to the sequential write storage and is in a cache state of clean when the MSN assigned to the selected cache block is less than or equal to the CSN.

5. The method of claim 1, wherein the migration threshold is based on an amount of free space in the cache storage.

6. The method of claim 1, wherein the migration threshold is based on at least one of a number of modified cache blocks belonging to one or more virtual volumes, an elapsed time since a write to one or more of the cache blocks, and a minimum amount of data stored in cache blocks having a cache state of dirty and modified.

7. The method of claim 1, wherein only cache blocks that have a cache state of dirty and modified are selected for migration.

8. The method of claim 1, wherein the selecting is based on at least one of an access sequence and a modification order.

9. The method of claim 1, wherein the selecting is based on at least one of an elapsed time since a write to a cache block and a number of modified cache blocks in one or more virtual volumes.

10. The method of claim 1, wherein the migration candidate list organizes the cache blocks into the virtual volumes based on application access.

11. The method of claim 1, wherein the migration candidate list organizes the cache blocks within the virtual volumes based on at least one of a last write timestamp and a virtual extent number.

12. A memory system, comprising:
a cache storage comprising a cache storage device; and
a storage controller coupled to the cache storage and to a sequential write storage device, the memory system configured for:
tracking cache states of cache blocks in a cache storage, the tracking including creating a migration candidate list that organizes the cache blocks into virtual volumes;
determining that a migration threshold has been reached; and
based on reaching the migration threshold:
selecting a plurality of the cache blocks from the migration candidate list for migration;
ordering the selected cache blocks into a sequential order based on the migration candidate list, wherein the selected cache blocks that are located on the same virtual volume are grouped together in the sequential order; and
migrating, in the sequential order, at least a subset of the selected cache blocks, the migrating comprising, for each of the selected cache blocks in the subset, writing contents of the selected cache blocks to the sequential write storage.

13. The system of claim 12, wherein the migrating further comprises:
periodically, based on the writing being completed for one or more of the selected cache blocks in the subset, updating the cache state of the one or more of the selected cache blocks in the subset to indicate that contents of the one or more of the selected cache blocks in the subset have completed migration to the sequential write storage.

14. The system of claim 13, wherein:
the ordering includes assigning migration sequence numbers (MSNs) to the selected cache blocks to indicate the sequential order;
the updating the cache state includes updating a commit sequence number (CSN) with an MSN associated with a selected cache block whose contents have completed migration to the sequential write storage;
a selected cache block has not completed migration to the sequential write storage and is in a cache state of dirty when the MSN assigned to the selected cache block is larger than the CSN; and
the selected cache block has completed migration to the sequential write storage and is in a cache state of clean when the MSN assigned to the selected cache block is less than or equal to the CSN.

15. The system of claim 12, wherein the migration threshold is based on an at least one of an amount of free space in the cache storage, a number of modified cache blocks belonging to one or more virtual volumes, an elapsed time since a write to one or more of the cache blocks, and a minimum amount of data stored in cache blocks having a cache state of dirty and modified.

16. The system of claim 12, wherein the selecting is based on at least one of an access sequence, a modification order, an elapsed time since a write to a cache block, and a number of modified cache blocks in one or more virtual volumes.

17. The system of claim 12, wherein the migration candidate list organizes the cache blocks into the virtual volumes based on application access.

18. A computer program product for cache management for sequential write storage, the computer program product comprising:
a non-transitory computer readable storage medium having program instructions embodied therewith, the program instructions readable by a processing circuit to cause the processing circuit to perform a method comprising:
tracking cache states of cache blocks in a cache storage, the tracking including creating a migration candidate list that organizes the cache blocks into virtual volumes;
determining that a migration threshold has been reached; and
based on reaching the migration threshold:
selecting a plurality of the cache blocks from the migration candidate list for migration;
ordering the selected cache blocks into a sequential order based on the migration candidate list, wherein the selected cache blocks that are located on the same virtual volume are grouped together in the sequential order; and
migrating, in the sequential order, at least a subset of the selected cache blocks, the migrating comprising, for each of the selected cache blocks in the subset, writing contents of the selected cache blocks to the sequential write storage.

19. The computer program product of claim 18, wherein the migrating further comprises:
periodically, based on the writing being completed for one or more of the selected cache blocks in the subset, updating the cache state of the one or more of the selected cache blocks in the subset to indicate that contents of the one or more of the selected cache blocks in the subset have completed migration to the sequential write storage.

20. The computer program product of claim 18, wherein the migration candidate list organizes the cache blocks into the virtual volumes based on application access.

* * * * *